United States Patent
Ishii

(10) Patent No.: US 10,737,221 B2
(45) Date of Patent: Aug. 11, 2020

(54) SCALE INHIBITOR FOR REVERSE OSMOSIS MEMBRANES AND REVERSE OSMOSIS MEMBRANE TREATMENT METHOD

(71) Applicant: KURITA WATER INDUSTRIES LTD., Tokyo (JP)

(72) Inventor: Kazuki Ishii, Tokyo (JP)

(73) Assignee: KURITA WATER INDUSTRIES LTD., Tokyo (JP)

(*) Notice: Subject to any disclaimer, the term of this patent is extended or adjusted under 35 U.S.C. 154(b) by 0 days.

(21) Appl. No.: 16/071,791

(22) PCT Filed: Sep. 12, 2016

(86) PCT No.: PCT/JP2016/076826
§ 371 (c)(1),
(2) Date: Jul. 20, 2018

(87) PCT Pub. No.: WO2017/163455
PCT Pub. Date: Sep. 28, 2017

(65) Prior Publication Data
US 2019/0030489 A1   Jan. 31, 2019

(30) Foreign Application Priority Data
Mar. 24, 2016  (JP) ................. 2016-059888

(51) Int. Cl.
*B01D 65/08* (2006.01)
*C02F 5/10* (2006.01)
(Continued)

(52) U.S. Cl.
CPC .......... *B01D 65/08* (2013.01); *B01D 61/025* (2013.01); *B01D 71/40* (2013.01); *C02F 5/10* (2013.01);
(Continued)

(58) Field of Classification Search
CPC ........ C10L 1/1883; C10L 10/18; C10L 1/188; C10L 2230/08; C10M 2207/127;
(Continued)

(56) References Cited

U.S. PATENT DOCUMENTS 5,061,396 A * 10/1991 Lovine ................ C11D 3/3757
                                                    510/321
5,087,682 A *  2/1992 Iovine .................. C08F 210/00
                                                    525/327.2
(Continued)

FOREIGN PATENT DOCUMENTS

JP     S59-179196 A   10/1984
JP     H02-031894 A    2/1990
(Continued)

OTHER PUBLICATIONS

PCT/ISA/210, "International Search Report for International Application No. PCT/JP2016/076826," dated Nov. 15, 2016.
(Continued)

*Primary Examiner* — Ana M Fortuna
(74) *Attorney, Agent, or Firm* — Manabu Kanesaka

(57) ABSTRACT

Provided is a scale inhibitor for RO membranes which effectively inhibits the precipitation of calcium carbonate in an RO membrane treatment without increasing the phosphorus concentration in effluent and which can be used even in the RO membrane treatment of feed in which high-M-alkalinity concentrate having a calcium hardness level of 100 to 600 mg/L-$CaCO_3$ and an M alkalinity of 1000 to 16000 mg-$CaCO_3$/L is produced. A scale inhibitor for reverse osmosis membranes which inhibits the formation of calcium carbonate scale in an RO membrane treatment, the scale inhibitor including components (A) and (B) below. An RO membrane treatment method including adding the scale inhibitor for RO membranes to RO feed. Component (A): Terpolymer of maleic acid, an acrylic acid alkyl ester, and
(Continued)

vinyl acetate, Component (B): Homopolymer of carboxylic acid

7 Claims, 2 Drawing Sheets

(51) Int. Cl.
  *B01D 61/02* (2006.01)
  *C02F 1/44* (2006.01)
  *B01D 71/40* (2006.01)
  *B01D 1/10* (2006.01)
  *B01D 61/10* (2006.01)

(52) U.S. Cl.
  CPC .......... *B01D 61/10* (2013.01); *B01D 2311/04* (2013.01); *B01D 2311/12* (2013.01); *B01D 2321/168* (2013.01); *B01D 2323/46* (2013.01); *C02F 1/441* (2013.01); *C02F 2303/22* (2013.01)

(58) Field of Classification Search
  CPC ........ C10M 2215/04; C10M 2215/042; C10M 2215/28; C10M 2215/02; C10M 133/56; C10M 2217/043; C10M 133/44; C10M 2215/223; C10M 159/12; C10M 133/04; C10M 133/06; C10M 133/08; C10M 133/16; C10M 133/46; C10M 133/58; C10M 2207/125; C10M 2207/129; C10M 2215/08; C10M 2215/082; C10M 2215/224; C10M 2215/26; C10M 2215/30; B01D 2311/04; B01D 2311/12; B01D 61/025; B01D 71/40; C02F 1/441; C02F 2303/22; C02F 5/10; B01J 13/02
  See application file for complete search history.

(56) References Cited

U.S. PATENT DOCUMENTS

| | | | | |
|---|---|---|---|---|
| 2011/0297614 A1* | 12/2011 | Ikuno | ................ | A01N 59/00 210/639 |
| 2014/0116472 A1* | 5/2014 | Dahlquist | ................ | C11D 7/06 510/475 |
| 2016/0046515 A1 | 2/2016 | Nishida | | |
| 2016/0096908 A1* | 4/2016 | Wang | ................ | C09K 8/528 166/304 |
| 2017/0114272 A1* | 4/2017 | Vo | ................ | C04B 28/02 |

FOREIGN PATENT DOCUMENTS

| | | |
|---|---|---|
| JP | H02-280897 A | 11/1990 |
| JP | 2012-206044 A | 10/2012 |
| JP | 2013-531705 A | 8/2013 |
| TW | 201446659 A | 12/2014 |
| WO | 2005/116296 A1 | 12/2005 |
| WO | 2012/114953 A1 | 8/2012 |

OTHER PUBLICATIONS

Taiwan Patent Office, "Office Action for Taiwanese Patent Application No. 105130856," dated Feb. 20, 2020.

China Patent Office, "Office Action for Chinese Patent Publication No. 201680068936.5," dated Nov. 8, 2019.

Zhuji, H., "Chemical Aid (化工助剂)," Fine Chemical Product Production Series (精细化工产品生产系列), Dec. 31, 2009, p. 643, Jiangxi Science & Technology Press.

Yan, L., "Water treatment chemicals and formulae manual (水处理药剂及配方手册)," Jan. 31, 2004, p. 177-178, China Petrochemical Press.

* cited by examiner

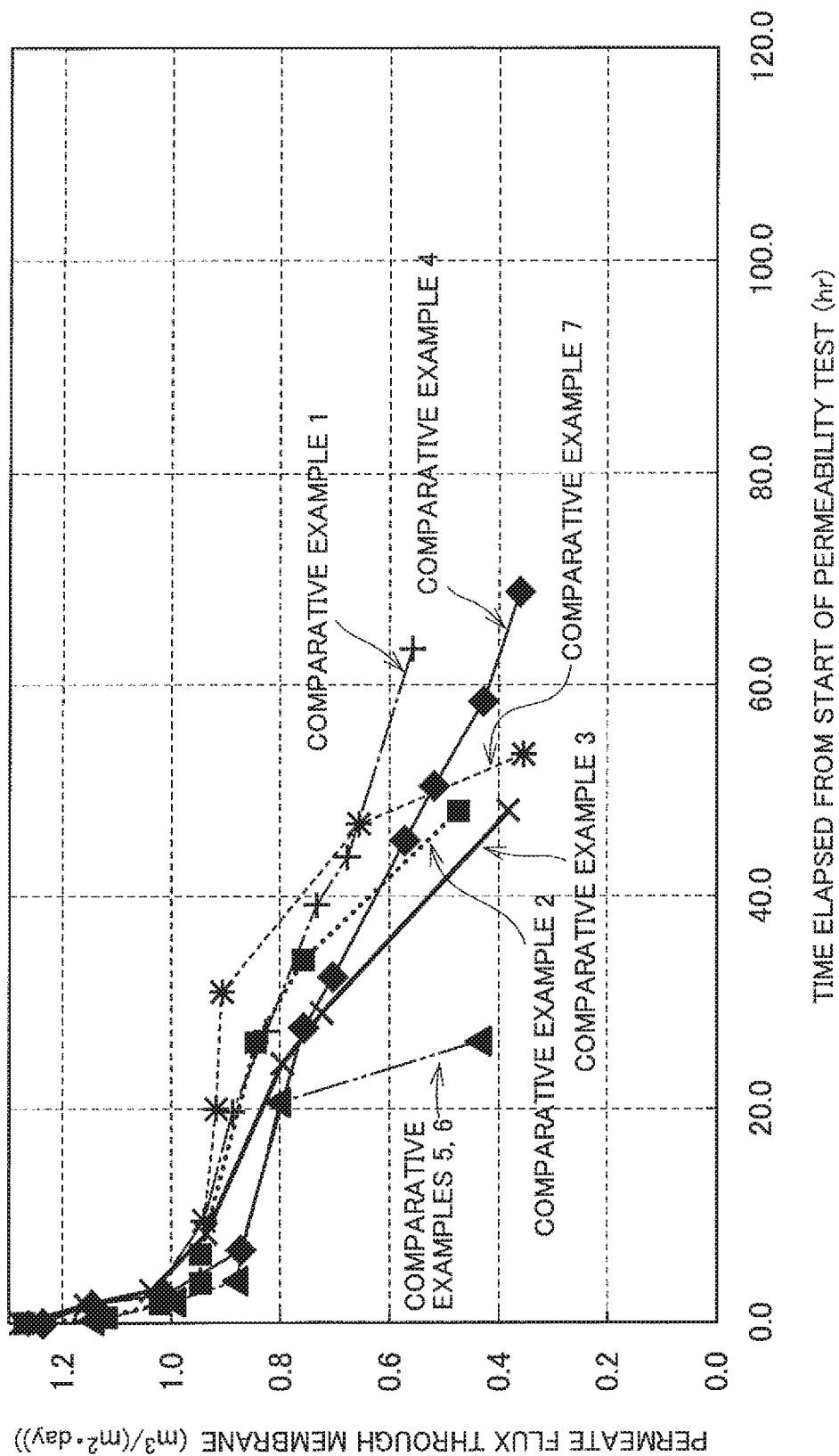

SCALE INHIBITOR FOR REVERSE OSMOSIS MEMBRANES AND REVERSE OSMOSIS MEMBRANE TREATMENT METHOD

TECHNICAL FIELD

The present invention relates to a scale inhibitor that inhibits the formation of calcium carbonate scale in a reverse osmosis membrane (RO membrane) treatment and an RO membrane treatment method in which the scale inhibitor is used.

BACKGROUND ART

There has been an active effort to conserve water in desalination of seawater or salt water and an effluent recovery system by increasing the water recovery rate of an RO membrane system. Operating an RO membrane system at a high recovery rate involves the concentration of scale components, which cause scaling. Examples of the types of scale include calcium carbonate, calcium sulfate, calcium sulfite, calcium phosphate, calcium silicate, magnesium silicate, magnesium hydroxide, zinc phosphate, zinc hydroxide, and zinc carbonate basic. The formation of calcium carbonate scale during the high-recovery operation of an RO membrane system becomes significant particularly in an effluent recovery system, in which water having a high M alkalinity may be present.

Phosphorus-containing scale inhibitors, such as inorganic polyphosphates (e.g., sodium hexametaphosphate and sodium tripolyphosphate) and phosphonic acids (e.g., aminomethylphosphonic acid and phosphonobutanetricarboxylic acid), have been used for inhibiting the formation of calcium scale in an RO membrane treatment, because the phosphorus-containing scale inhibitors have a relatively low molecular weight and a large scale-inhibition effect.

There have been demands for phosphorus-free scale inhibitors due to the regulation of the phosphorus concentration in effluent.

PTL 1 proposes a phosphorus-free calcium carbonate scale inhibitor that is a copolymer of maleic acid and isobutylene or a terpolymer of maleic acid, vinylethyl acetate, and ethyl acrylate.

In PTL 1, a terpolymer that corresponds to the component (A) used in the present invention is described, and polyacrylic acid is described as an example of the other scale inhibitor that can be used in combination with the terpolymer. However, in PTL 1, no mention is made of a specific example in which the above scale inhibitors are used in combination, and only a general description is provided without any discussion of applicable conditions, advantageous effects, or the like.

PTL 2 proposes a technique in which an AA (acrylic acid)-AMPS (2-acrylamide-2-methylpropylsulfonic acid) copolymer and PMA (polymaleic acid) are used in combination.

In PTL 2, although it is described that using PMA and the AA-AMPS polymer in combination produces a large scale-inhibition effect, no mention is made of the component (A) used in the present invention.

In PTL 3, an example in which polymaleic acid (molecular weight: 580) and maleic acid-ethyl acrylate-vinyl acetate (molecular weight: 850) are used in combination is described. In PTL 3, the aqueous systems to which the above polymers may be applied are described as follows: "With respect to aqueous systems which may be treated according to the present invention, of particular interest are cooling water systems, steam generating systems, sea-water evaporators, reverse osmosis equipment, bottle washing plants, pulp and paper manufacturing equipment, sugar evaporator equipment, soil irrigation systems, hydrostatic cookers, gas scrubbing systems, closed circuit heating systems, aqueous-based refrigeration systems and oil production and drilling systems". However, in PTL 3, the above polymers are not supposed to be applied to reverse osmosis membranes. PTL 3 does not disclose any substantial application of the polymers as a scale inhibitor for RO membranes. In PTL 3, no mention is made of the qualities of water that may be treated with an RO membrane or the specific conditions and composition of the polymers suitable for a specific RO membrane treatment.

PTL 1: WO2012/114953
PTL 2: JP 2013-531705 A
PTL 3: JP H2-280897 A

SUMMARY OF INVENTION

An object of the present invention is to provide a scale inhibitor for RO membranes which effectively inhibits the precipitation of calcium carbonate in an RO membrane treatment without increasing the phosphorus concentration in effluent and which can be used even in the RO membrane treatment of feed in which high-M-alkalinity concentrate having a calcium hardness level of 100 to 600 mg/L-$CaCO_3$ and an M alkalinity of 1000 to 16000 mg-$CaCO_3$/L is produced. Another object of the present invention is to provide an RO membrane treatment method in which the scale inhibitor is used.

The inventor of the present invention found that it is possible to effectively inhibit the formation of calcium carbonate scale in an RO membrane treatment even in a water system having a high M alkalinity by using the specific components (A) and (B) described below in combination.

The summary of the present invention is as follows.

[1] A scale inhibitor for reverse osmosis membranes which inhibits formation of calcium carbonate scale in a reverse osmosis membrane treatment, the scale inhibitor comprising components (A) and (B) below.

Component (A): Terpolymer of maleic acid, an acrylic acid alkyl ester, and vinyl acetate Component (B): Homopolymer of carboxylic acid

[2] The scale inhibitor for reverse osmosis membranes according to [1], wherein the component (B) is polyacrylic acid and/or polymaleic acid.

[3] The scale inhibitor for reverse osmosis membranes according to [1] or [2], wherein the content of maleic acid in the component (A) is 50 mol % or more.

[4] The scale inhibitor for reverse osmosis membranes according to any one of [1] to [3], wherein the component (A) has a mass-average molecular weight of 3000 or less.

[5] The scale inhibitor for reverse osmosis membranes according to any one of [1] to [4], wherein the component (B) has a mass-average molecular weight of 10000 or less.

[6] The scale inhibitor for reverse osmosis membranes according to any one of [1] to [5], wherein the mass ratio between the components (A) and (B) is component (A): component (B)=10:1 to 1:30

[7] The scale inhibitor for reverse osmosis membranes according to any one of [1] to [6], wherein concentrate produced in the reverse osmosis membrane treatment has a calcium hardness level of 100 to 600 mg/L-$CaCO_3$ and an M alkalinity of 1000 to 16000 mg-$CaCO_3$/L.

[8] A reverse osmosis membrane treatment method comprising adding the scale inhibitor for reverse osmosis membranes according to any one of the [1] to [7] to feed to a reverse osmosis membrane and subjecting the feed to a reverse osmosis treatment.

[9] The reverse osmosis membrane treatment method according to [8], wherein the scale inhibitor for reverse osmosis membranes is added to the feed such that the concentration of the component (A) in the feed is 0.01 to 50 mg/L and the concentration of the component (B) in the feed is 0.01 to 50 mg/L.

[10] The reverse osmosis membrane treatment method according to [8] or [9], wherein concentrate produced in the reverse osmosis membrane treatment has a calcium hardness level of 100 to 600 mg/L-$CaCO_3$ and an M alkalinity of 1000 to 16000 mg-$CaCO_3$/L.

Advantageous Effects of Invention

The scale inhibitor for RO membranes according to the present invention may provide the following advantageous effects.

(1) Since the scale inhibitor does not contain phosphorus, it effectively inhibits the precipitation of calcium carbonate in an RO membrane treatment without increasing the phosphorus concentration in effluent.

(2) The scale inhibitor can be used even in the RO membrane treatment of feed in which high-M-alkalinity concentrate having a calcium hardness level of 100 to 600 mg/L-$CaCO_3$ and an M alkalinity of 1000 to 16000 mg-$CaCO_3$/L is produced.

(3) Using the components (A) and (B) in combination produces a large scale-inhibition effect in a synergistic manner, which inhibits the formation of calcium carbonate scale at a sufficient level.

The RO membrane treatment method according to the present invention, in which the scale inhibitor for RO membranes according to the present invention is used, enables the treatment to be continued consistently over a long period of time without causing scaling even in the case where feed having a high M alkalinity is subjected to an RO membrane treatment with a high recovery rate.

BRIEF DESCRIPTION OF DRAWINGS

FIG. 2 is a graph illustrating changes in the fluxes measured in Comparative examples 1 to 7 with time.

Description of Embodiments

Figure 1:
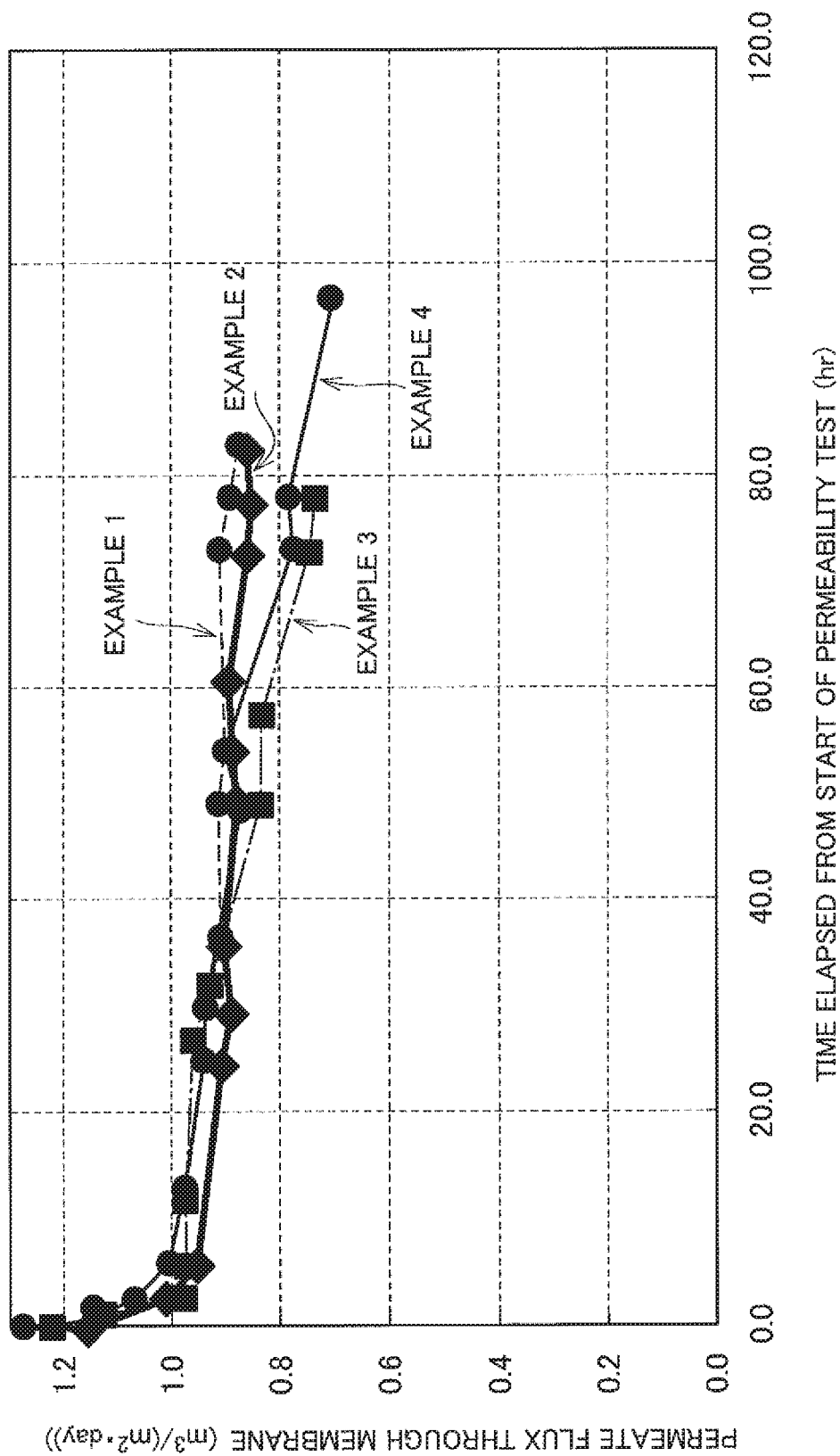
FIG. 1 is a graph illustrating changes in the fluxes measured in Examples 1 to 4 with time.

An embodiment of the present invention is described in detail below.

The term "mass-average molecular weight" of a polymer which is used herein refers to mass-average molecular weight determined by gel permeation chromatography using sodium polyacrylate as a reference material.

<Scale Inhibitor for RO Membranes>

The scale inhibitor for RO membranes according to the present invention is a scale inhibitor that inhibits the formation of calcium carbonate scale in an RO membrane treatment and includes the components (A) and (B) below.

Component (A): Terpolymer of maleic acid, an acrylic acid alkyl ester, and vinyl acetate Component (B): Homopolymer of carboxylic acid <<Component (A)>>

The component (A) is a terpolymer of maleic acid, an acrylic acid alkyl ester, and vinyl acetate.

The acrylic acid alkyl ester preferably includes an alkyl ester portion having 1 to 8 carbon atoms. Specific examples of such an acrylic acid alkyl ester include methyl acrylate, ethyl acrylate, isopropyl acrylate, n-butyl acrylate, and 2-ethylhexyl acrylate. The component (A) may include two or more of the above acrylic acid alkyl esters.

The content of maleic acid in the terpolymer that is the component (A) (the proportion of the constitutional unit resulting from maleic acid to all the constitutional units resulting from the monomers constituting the terpolymer) is preferably 50 mol % or more, is more preferably 60 mol % or more, and is more preferably 70 mol % or more. If the maleic acid content is less than 50 mol %, the amount of carboxyl groups, which are anionic groups, is so small that the component (A) is likely to become gelated. In addition, the calcium carbonate-scale inhibition effect may become degraded. The upper limit for the maleic acid content is preferably set to 90 mol %, since the component (A) also includes other copolymerization components in certain amounts.

The content of vinyl acetate in the terpolymer that is the component (A) (the proportion of the constitutional unit resulting from vinyl acetate to all the constitutional units resulting from the monomers constituting the terpolymer) is preferably 1 mol % or more and is more preferably 10 mol % or more. If the vinyl acetate content is lower than the above lower limit, it becomes difficult to perform polymerization. The upper limit for the vinyl acetate content is preferably set to 40 mol %, since the component (A) also includes other copolymerization components in certain amounts.

The content of the acrylic acid alkyl ester in the terpolymer that is the component (A) (the proportion of the constitutional unit resulting from the acrylic acid alkyl ester to all the constitutional units resulting from the monomers constituting the terpolymer) is preferably 1 mol % or more and is preferably 10 mol % or more. If the content of the acrylic acid alkyl ester is lower than the above lower limit, it becomes difficult to adjust molecular weight. The upper limit for the content of the acrylic acid alkyl ester is preferably set to 40 mol %, since the component (A) also includes other copolymerization components in certain amounts.

If the mass-average molecular weight (hereinafter, referred to as "molecular weight (Mw)") of the terpolymer of maleic acid, the acrylic acid alkyl ester, and vinyl acetate, which is the component (A), is excessively high, the scale-inhibition effect may become degraded. If the molecular weight (Mw) of the component (A) is excessively high, the polymer having a high viscosity may adhere to an RO membrane to reduce the flux through the RO membrane. If the molecular weight (Mw) of the component (A) is excessively low, the scale-inhibition effect may fail to be achieved at a sufficient level.

The molecular weight (Mw) of the component (A) is preferably 3000 or less and is more preferably 1200 to 1800.

<<Component (B)>>

The component (B) is a homopolymer of carboxylic acid and is preferably polyacrylic acid and/or polymaleic acid.

If the mass-average molecular weight (molecular weight (Mw)) of the homopolymer of carboxylic acid, which is the component (B), is excessively high, the scale-inhibition effect may become degraded. If the molecular weight (Mw) of the component (B) is excessively high, the polymer having a high viscosity may adhere to an RO membrane to reduce the flux through the RO membrane. If the molecular weight (Mw) of the component (B) is excessively low, the scale-inhibition effect may fail to be achieved at a sufficient level.

The molecular weight (Mw) of the component (B) is preferably 10000 or less and is more preferably 1000 to 8000.

<<Ratio Between Amounts of Components (A) and (B)>>

The mass ratio of the amounts of components (A) and (B) used is preferably component (A):component (B)=10:1 to 1:30 in order to allow the synergistic effects to be effectively achieved by using the components (A) and (B) in combination.

In the case where the component (B) is polyacrylic acid or polymethacrylic acid, the mass ratio of the amounts of components (A) and (B) is preferably component (A):component (B)=2:1 to 1:30, is particularly preferably 1.5:1 to 1:20, and is further preferably 1:1 to 1:10.

In the case where the component (B) is polymaleic acid, the mass ratio of the amounts of components (A) and (B) is preferably component (A):component (B)=10:1 to 2:1, because polymaleic acid is likely to become gelated.

The scale inhibitor for RO membranes according to the present invention preferably includes the components (A) and (B) at the above mass ratio.

The scale inhibitor for RO membranes according to the present invention may be provided such that the components (A) and (B) are separated from each other. Alternatively, the components (A) and (B) may be mixed with each other to form a single component.

Normally, the components (A) and (B) are added to the feed to an RO membrane treatment as an aqueous solution containing the components (A) and (B) at a concentration of 10 to 100,000 mg/L in total.

<RO Membrane Treatment Method>

The RO membrane treatment method according to the present invention includes adding the scale inhibitor for RO membranes according to the present invention to the feed to an RO membrane treatment (hereinafter, referred to as "RO feed") and subjecting the RO feed to the RO membrane treatment.

The amount of scale inhibitor for RO membranes added to the RO feed varies with the likelihood of formation of calcium carbonate scale which varies with the qualities of the RO feed and the recovery rate (concentration rate) of the RO membrane treatment. In general, the scale inhibitor for RO membranes is preferably added to the RO feed such that the concentration of the component (A) in the RO feed is 0.01 to 50 mg/L and is particularly preferably 1 to 20 mg/L and the concentration of the component (B) in the RO feed is 0.01 to 50 mg/L and is particularly preferably 1 to 20 mg/L while the above-described suitable mass ratio is achieved.

If the amounts of components (A) and (B) added to the RO feed are excessively small, the scale-inhibition effect may fail to be achieved at a sufficient level. If the amounts of components (A) and (B) added to the RO feed are excessively large, they may adhere to an RO membrane to reduce the flux through the RO membrane.

According to the present invention, the formation of calcium carbonate scale in an RO membrane treatment can be inhibited at a sufficient level due to the remarkable synergistic effects of using the components (A) and (B) in combination. The advantageous effects can be achieved with effect even in a RO membrane treatment in which RO feed having a high M alkalinity is treated with a high recovery rate to produce RO concentrate having a calcium hardness level of 100 to 600 mg/L-$CaCO_3$ and an M alkalinity of 1000 to 16000 mg-$CaCO_3$/L, which is likely to cause the formation of calcium carbonate scale.

EXAMPLES

The present invention is described more specifically with reference to Examples below.

The abbreviations for the monomers used herein are listed below.

MA: Maleic acid
IB: Isobutylene
VA: Vinyl acetate
EA: Ethyl acrylate
AA: Acrylic acid
SA: Sulfonic acid <Polymers Used>

The details of the polymers used in Examples and Comparative examples below are as follows.

<<Component (A)>>

Polymer A-1: Maleic acid/vinyl acetate/ethyl acrylate terpolymer
   MA/VA/EA=75/12.5/12.5
     (mol %)
   Molecular weight (Mw)=1900

<<Component (B)>>

Polymer B-1: Polyacrylic acid
   AA=100 (mol %)
   Molecular weight (Mw)=2000
Polymer B-2: Polyacrylic acid
   AA=100 (mol %)
   Molecular weight (Mw)=5500
Polymer B-3: Polyacrylic acid
   AA=100 (mol %)
   Molecular weight (Mw)=8000

<<Others>>

Polymer C-1: Acrylic acid/sulfonic acid copolymer
   AA/SA=80/20 (mol %)
   Molecular weight (Mw)=2000
Polymer C-2: Acrylic acid/sulfonic acid copolymer
   AA/SA=80/20 (mol %)
   Molecular weight (Mw)=5500
Polymer C-3: Acrylic acid/sulfonic acid copolymer
   AA/SA=80/20 (mol %)
   Molecular weight (Mw)=2200

<RO Membrane Permeability Test>

In Examples and Comparative examples below, an RO membrane permeability test was conducted under the following test conditions. The pressure was adjusted such that a recovery rate of 75% was achieved. The permeation flux thorough the membrane was determined on the basis of flow rate×temperature correction×pressure correction. That is, correction was made to compensate for temperature and pressure.

<<Test Conditions>>

RO feed: An aqueous solution containing calcium chloride (100 mg/L), sodium hydrogen carbonate (2100 mg/L), and 20 mg/L of the specific one of the scale inhibitors described in Tables 1A and 1B (as a polymer that served as an active component) was prepared. A small amount of an aqueous sodium hydroxide solution or an aqueous sulfuric acid solution was added to the aqueous solution such that the pH of the aqueous solution was adjusted to be 8.0 to 8.1. This aqueous solution was used as RO feed.

Type of RO membrane: Polyamide RO membrane (ES20 produced by Nitto Denko Corporation)
   Temperature: 30° C.±1° C.
   RO recovery rate: 75%

Since 4-fold concentration was performed, the concentration of calcium chloride in the RO concentrate was 400 mg/L (calcium hardness level: 360 mg/L-CaCO$_3$) and the concentration of sodium hydrogen carbonate in the RO concentrate was 8400 mg/L (M alkalinity: 4800 mg/L-CaCO$_3$).

TABLE 1A

Scale inhibitor

| Example | Type of polymer | Proportions of monomers (mol %) | Molecular weight (Mw) | Compositional ratio (by mass) |
|---|---|---|---|---|
| 1 | Polymer A-1 (MA/VA/EA) | 75/12.5/12.5 | 1900 | A-1:B-1 = 1:1 |
|   | Polymer B-1 (AA) | 100 | 2000 | |
| 2 | Polymer A-1 (MA/VA/EA) | 75/12.5/12.5 | 1900 | A-1:B-1 = 1:2 |
|   | Polymer B-1 (AA) | 100 | 2000 | |
| 3 | Polymer A-1 (MA/VA/EA) | 75/12.5/12.5 | 1900 | A-1:B-1 = 2:1 |
|   | Polymer B-1 (AA) | 100 | 2000 | |
| 4 | Polymer A-1 (MA/VA/EA) | 75/12.5/12.5 | 1900 | A-1:B-2 = 1:2 |
|   | Polymer B-2 (AA) | 100 | 5500 | |

TABLE 1B

Scale inhibitor

| Comparative example | Type of polymer | Proportions of monomers (mol %) | Molecular weight (Mw) | Compositional ratio (by mass) |
|---|---|---|---|---|
| 1 | Polymer A-1 (MA/VA/EA) | 75/12.5/12.5 | 1900 | — |
| 2 | Polymer B-1 (AA) | 100 | 2000 | — |
| 3 | Polymer B-2 (AA) | 100 | 5500 | — |
| 4 | Polymer B-3 (AA) | 100 | 8000 | — |
| 5 | Polymer C-1 (AA/SA) | 80/20 | 2000 | — |
| 6 | Polymer C-2 (AA/SA) | 80/20 | 5500 | — |
| 7 | Polymer A-1 (MA/VA/EA) | 75/12.5/12.5 | 1900 | A-1:C-3 = 1:1 |
|   | Polymer C-3 (AA/SA) | 80/20 | 2200 | |

FIGS. 1 and 2 illustrate the results.

The results illustrated in FIGS. 1 and 2 confirm that, in Examples 1 to 4 where the components (A) and (B) were used in combination, the reduction in flux was small and the treatment was performed consistently over a long period of time. This proves that the formation of calcium carbonate scale was inhibited.

In Comparative examples 1 to 4 where the component (A) or (B) was used alone and Comparative examples 5 and 6 where the AA/SA copolymer was used, the formation of calcium carbonate scale was not inhibited at a sufficient level and, consequently, the reduction in flux with time was significant. In Comparative example 7 where the MA/VA/EA terpolymer that is the component (A) and the AA/SA copolymer were used in combination, a sudden reduction in flux was observed after a lapse of 30 hours from the start of the permeability test.

Although the present invention has been described in detail with reference to particular embodiments, it is apparent to a person skilled in the art that various modifications can be made therein without departing from the spirit and scope of the present invention.

The present application is based on Japanese Patent Application No. 2016-059888 filed on Mar. 24, 2016, which is incorporated herein by reference in its entirety.

The invention claimed is:

1. A scale inhibitor for reverse osmosis membranes which inhibits formation of calcium carbonate scale in a reverse osmosis membrane treatment, the scale inhibitor comprising component (A) having a mass-average molecular weight of 3000 or less and component (B) having a mass-average molecular weight of 10000 or less shown below, and the mass ratio between the components (A) and (B) is component (A): component (B)=10:1 to 1:30,
    Component (A): Terpolymer of maleic acid, an acrylic acid alkyl ester, and vinyl acetate, wherein a content of maleic acid in the component (A) is 50 mol % or more and 90% mol or less, a content of vinyl acetate in the component (A) is 1 mol % or more and 40 mol % or less, and a content of the acrylic acid alkyl ester in the component (A) is 1 mol % or more and 40 mol % or less, and
    Component (B): Homopolymer of carboxylic acid, wherein the component (B) is polyacrylic acid, polymethacrylic acid, and/or polymaleic acid.

2. A reverse osmosis membrane treatment method comprising adding a scale inhibitor for reverse osmosis membranes according to claim 1 to feed and subjecting the feed to a reverse osmosis treatment,
    wherein concentrate produced in the reverse osmosis membrane treatment has a calcium hardness level of 100 to 600 mg/L-CaCO$_3$ and an M alkalinity of 1000 to 16000 mgCaCO$_3$/L.

3. The reverse osmosis membrane treatment method according to claim 2, wherein the scale inhibitor for reverse osmosis membranes is added to the feed such that the concentration of the component (A) in the feed is 0.01 to 50 mg/L and the concentration of the component (B) in the feed is 0.01 to 50 mg/L.

4. The scale inhibitor for reverse osmosis membranes according to claim 1, wherein the component (A) has a mass-average molecular weight of 1200 or more and 1900 or less.

5. The scale inhibitor for reverse osmosis membranes according to claim 1, wherein the component (B) has a mass-average molecular weight of 1000 or more and 8000 or less.

6. The scale inhibitor for reverse osmosis membranes according to claim 1, wherein the mass ratio between the components (A) and polyacrylic acid or polymethacrylic acid in the component (B) is 2:1-1:30.

7. The scale inhibitor for reverse osmosis membranes according to claim 1, wherein the mass ratio between the components (A) and polymaleic acid in the component (B) is 10:1-2:1.

* * * * *